United States Patent [19]

Yu

[11] Patent Number: 4,773,123
[45] Date of Patent: Sep. 27, 1988

[54] AUTOMATICALLY EXTENSIBLE AND RETRACTABLE WHEEL UNIT FOR MOUNTING ON A CORNER OF A SUITCASE

[75] Inventor: Wen-Chi Yu, Chang Hua, Taiwan
[73] Assignee: Tatie Industrial Co., Ltd., Taiwan
[21] Appl. No.: 9,894
[22] Filed: Feb. 2, 1987
[51] Int. Cl.⁴ .................................................. B60B 33/06
[52] U.S. Cl. ..................................... 16/34; 190/18 A; 280/37; 280/43.24
[58] Field of Search .......................... 16/34; 190/18 A; 280/37, 43.17, 43.24

[56] References Cited

U.S. PATENT DOCUMENTS

| | | | |
|---|---|---|---|
| 2,774,986 | 12/1956 | Moorehouse | 16/34 |
| 4,026,569 | 5/1977 | Staal | 16/34 X |
| 4,097,955 | 7/1978 | Foge et al. | 16/34 X |

Primary Examiner—Fred A. Silverberg
Attorney, Agent, or Firm—Kramer, Brufsky & Cifelli

[57] ABSTRACT

The automatically extensible and retractable wheel unit for mounting on a corner of a suitcase includes a housing with an aperture at the underside thereof, a bifurcated bracket pivotally supported on the housing, a wheel carried rotatably on the bracket for pivoting along with the bracket between a retracted position and an extended position, and a push-pull member pivotally supported on the housing and connected to a bracket by a C-shaped spring member. When the wheel is in the retracted position, a portion of the push-pull member extends out of the aperture so as to be contacted with the ground to push the wheel automatically out of the aperture as long as the suitcase is brought into a transported state. When the wheel is in the extended position, another portion of the push-pull member extends out of the aperture so as to be contacted with the ground to pull the wheel automatically back into the aperture as long as the suitcase being in a stationary state.

2 Claims, 3 Drawing Sheets

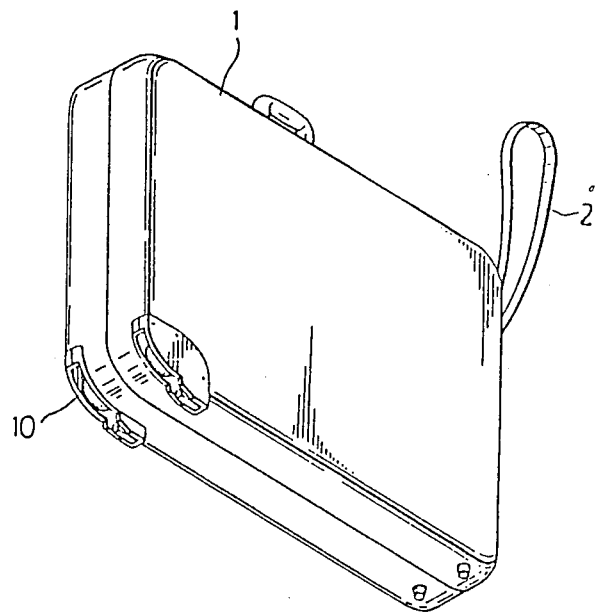
F I G. 1

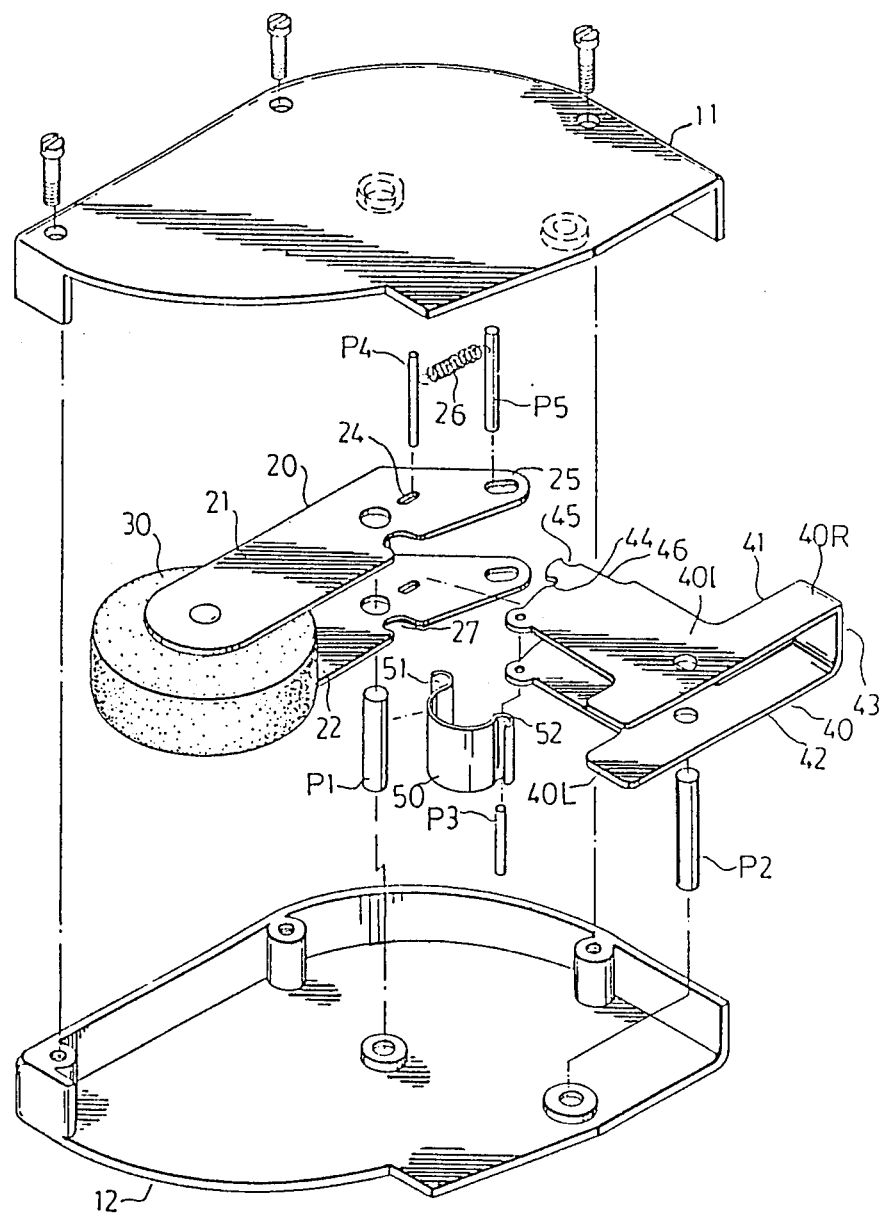
F I G. 2

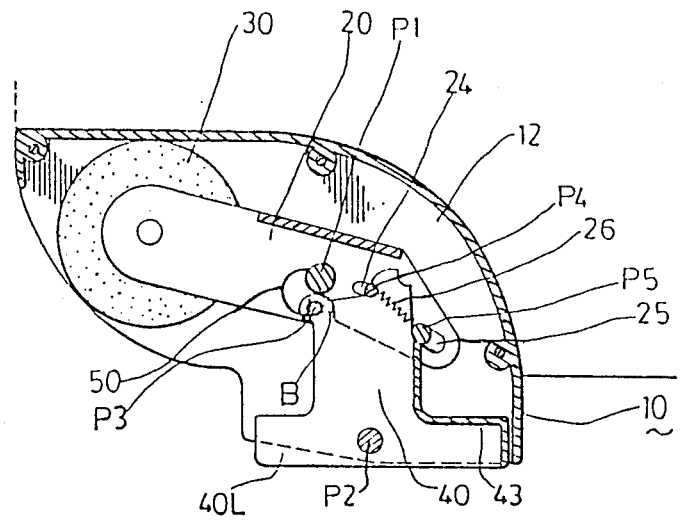
F I G. 3
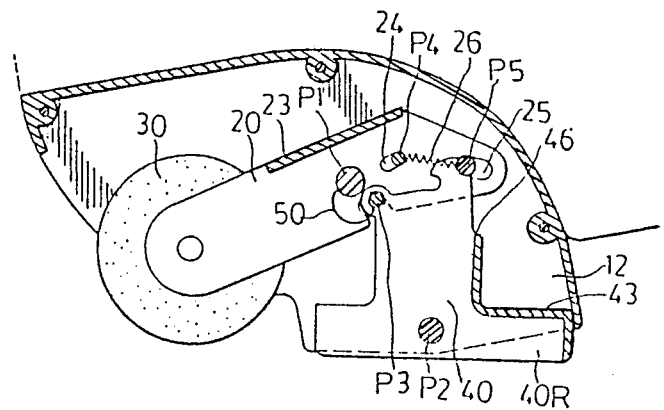
F I G. 4 ature of the invention

AUTOMATICALLY EXTENSIBLE AND RETRACTABLE WHEEL UNIT FOR MOUNTING ON A CORNER OF A SUITCASE

BACKGROUND OF THE INVENTION

The present invention relates to a wheel unit for mounting on a suitcase, particularly relates to an automatically extensible and retractable wheel unit for mounting on a corner of a suitcase.

U.S. Pat. No. 4,097,955 disclosed a wheel unit for mounting on a suitcase. The wheel unit has an extensible and retractable wheel for supporting the suitcase while rolling. However, in the operation of the prior wheel unit, a pin is necessary to be pressed manually inwardly. This is inconvenient and therefore required to be improved.

SUMMARY OF THE INVENTION

It is therefore an object of the invention to provide an automatically extensible and retractable wheel unit for mounting on a corner of a suitcase.

According to the present invention, the automatically extensible and retractable wheel unit for mounting on a corner of a suitcase includes a housing with an aperture at the underside thereof; a bifurcated bracket pivotally supported on the housing and including a pair of legs joined together; a wheel rotatably carried on the bracket for pivoting along with the bracket between a retracted position and an extended position; a push-pull member pivotally supported on the housing and having an extensible portion which comprises a first portion extending out of the aperture of the housing when the wheel is in the retracted position, and a second portion extending out of the aperture of said housing when said wheel is in the extended position; a spring member connected between the bracket and the push-pull member for the bias of relative position therebetween; and means for positioning the bracket and the push-pull member in the housing when the wheel is in both the retracted and extended positions; thereby, when the wheel is in the retracted position, the first portion of the push-pull member extends out of the aperture of the housing, and, when the suitcase is brought into a transported state, the first portion of the push-pull member will be in touch with the ground to be retracted into the housing through the aperture, so that the push-pull member rotates in a first direction and in turn actuates the bracket to rotate in a second direction, therefore moving the wheel to the extended position; when the wheel is in the extended position, the second portion of the push-pull member extends out of the aperture of the housing, and, when the suitcase is brought into a stationary state, the second portion of the push-pull member will be in touch with the ground to be retracted into the housing through the aperture, so that the push-pull member rotates in the second direction and in turn actuates the bracket to rotate in the first direction, therefore again moving the wheel to the retracted position.

BRIEF DESCRIPTION OF THE DRAWINGS

Other features and advantages of the present invention will become more apparent from the following detailed description of one example of a preferred but not a sole form of embodiment, given below with reference to the accompanying drawings, in which:

FIG. 1 is a suitcase incorporating a pair of automatically extensible and retractable wheel units of the invention which are respectively mounted on aligned corners thereof;

FIG. 2 is an exploded view of the wheel unit of the invention;

FIG. 3 is a longitudinal sectional view of the wheel unit of the invention, showing the state of the wheel being in a retracted position; and FIG. 4 is a longitudinal sectional view of the wheel unit of the invention, showing the state of the wheel being in an extended position.

DETAILED DESCRIPTION OF THE PREFERRED EMBODIMENT

Referring to FIGS. 2 through 4 of the drawings, there is shown a wheel unit 10 according to the invention. The wheel unit 10, as shown in FIG. 1, is mounted on a corner of a suitcase 1. On the corner opposing from said wheel unit 10, there is provided with a pull-band 2.

The wheel unit 10 includes a housing consisting of two mutually screwed halves 11 and 12 forming an aperture at the underside thereof, a bifurcated bracket 20 with a pair of legs 21 and 22 joined together by a connecting part 23 (see FIGS. 3 and 4), a wheel 30 carried rotatably on the bracket 20, and a generally T-shaped push-pull member 40 having two T-shaped sheets 41 and 42 joined together by a connecting part 43. Each of the T-shaped sheets 41 and 42 has a left branch 40L, a right branch 40R, and an intermediate branch 40I. The bracket 20 and the push-pull member 40 are pivotally supported on the housing 12 and 13 by pivot pins P1 and P2 respectively.

On the end of the intermediate branch 40I of the push-pull member 40, there is a pin P3 for connecting the bracket 20 by means of a C-shaped spring member 50 which has two recurved ends 51 and 52 respectively sleeved on said pivot pin P1 and pin P3.

Provided in the legs 21 and 22 of the bracket 20 are a pair of slide slots 24 and 25 in which a first positioning pin P4 and a second positioning pin P5 linked by a tension spring 26 are respectively received. Formed in the end of the intermediate portion 40I of the push-pull member 40 are first and second notches 44 and 45 arranged in two opposite directions. Also, formed in a side (i.e. the right side of drawings) of the intermediate branch 40I of the push-pull member 40 is a third notch 46. Furthermore, the bracket 20 is also provided with a fourth notch 27 for incorporating the pin P3 to be involved therein.

Referring to FIG. 3, when the wheel 30 is in a retracted position, the first positioning pin P4 is received in the first notch 44, and the second positioning pin P5 is received in the third notch 46. The positioning pins P4 and P5 are pulled toward with each other by the tension spring 26 to prevent the relative movement between the bracket 20 and the push-pull member 40. In this position the left branch 40L of the push-pull member 40 extends out of the aperture of the housing 11 and 12. It can be seen from FIG. 3, the pivot pin P3 is received in the leftmost position of the fourth notch 27 of the bracket 20. When the pull-band 2 of the suitcase 1 is pulled upwardly, the left branch 40L of the push-pull member 40 will contact the ground or the floor of a truck or other automobile, so as to be pushed rotatably into the housing 11 and 12, as shown in FIG. 4. During the rotation of the push-pull member 40, the pin P3 rotates clockwise with respect to the pivot pin P2 to move toward the right of the fourth notch 27 of the bracket 20. Before the pivot pin 52 reaches the position B, as shown in a phantom line of FIG. 3, the first positioning pin P4 is still catched partially by the first notch 44. Once the pivot pin 52 moves beyond the line interconnecting the pivot pins P1 and P2, the first positioning pin P4 is released from the first notch 44. Simultaneously, the bias force of the C-shaped spring memer 50 will cause the bracket 20 to rotate counterclockwise so that the second positioning pin P5 moves upwardly along the side edge of the intermediate branch 40I of the push-pull member 40 until it is catched by the second notch 45. The second positioning pin P5 is pulled by the tension spring 26 to the left of the slot 25 so as to position the bracket 20 and the push-pull member 40 in the housing 11 and 12, as shown in FIG. 4. In this position the right branch 40R of the push-pull member 40 extends out of the aperture of the housing 11 and 12. Once the bottom surface of the suitcase 1 is kept horizontally, the right branch 40R of the push-pull member 40 will contact the ground or the like to be pushed into the housing 11 and 12 so as to drive the push-pull member 40 to rotate counterclockwise and in turn to actuate the bracket 20 to rotate clockwise, therefore pulling the wheel 30 back into the housing 11 and 12.

With the invention thus explained, it is apparent that various modifications and variations can be made without departing from the scope of the invention. It is therefore intended that the invention be limited as indicated in the appended claims.

What is claimed is:

1. An automatically extensible and retractable wheel unit for mounting on a corner of a suitcase, comprising:
   a housing with an aperture at the underside thereof;
   a bifurcated bracket pivotally supported in said housing and including a pair of legs joined together;
   a wheel rotatably carried on said bracket for pivoting along with said bracket between a retracted position and an extended position;
   a push-pull member pivotally supported in said housing and having an extensible portion which comprises a first portion extending out of said aperture of said housing when said wheel and bracket are in the retracted position and a second portion extending out of said aperture of said housing when said wheel and bracket are in the extended position; and
   means for simultaneously supporting said bracket and said push-pull member in a first orientation in which said bracket is in said retracted position and said first portion of said push-pull member is in said extended position, simultaneously supporting said bracket and said push-pull member in a second orientation in which said bracket is in said extended position and said second portion of said push-pull member is in said extended position and transposing said bracket and said push-pull member between said first and second orientations such that when said first portion of said push-pull member is extended and contacts ground, the contact forces said push-pull member to rotate in a first direction which in turn actuates said bracket to rotate in a second direction to the extended position, and when said second portion of said push-pull member is extended and contacts the ground, the contact forces said push-pull member to rotate in the second direction which in turn actuates said bracket to rotate in the first direction to the retracted position, said means for supporting and transposing said bracket and said push-pull member comprising:
   a first slide slot provided in said bracket;
   a first positioning pin received slidably in said first slide slot;
   a second slide slot provided in said bracket and spaced from said first slide slot;
   a second positioning pin received slidably in said second slide slot;
   a tension spring linking said first positioning pin and said second positioning pin;
   a first notch provided in said push-pull member for receiving said first positioning pin therein when said bracket and wheel are in the retracted position;
   a second notch provided in said push-pull member and spaced from said first notch for receiving said second positioning pin therein when said bracket and wheel are in the extended position; and
   spring means for biasing said bracket to rotate in said second direction when said first portion of said push-pull member is extended and contacts the ground.

2. An automatically extensible and retractable wheel unit as set forth in claim 1, wherein said bracket pivots about a pin and said spring means comprises a C-shaped spring member connected between the pivot pin of said bracket and said push-pull member.

* * * * *